United States Patent [19]

Nakamura et al.

[11] Patent Number: 4,992,816
[45] Date of Patent: Feb. 12, 1991

[54] IMAGE RECORDING APPARATUS AND METHOD

[75] Inventors: Hiroshi Nakamura; Nagao Ogiwara, both of Kanagawa, Japan

[73] Assignee: Fuji Photo Film Co., Ltd., Kanagawa, Japan

[21] Appl. No.: 405,819

[22] Filed: Sep. 8, 1989

[30] Foreign Application Priority Data

Sep. 9, 1988 [JP] Japan .................. 63-226201
Sep. 9, 1988 [JP] Japan .................. 63-226202
Sep. 9, 1988 [JP] Japan .................. 63-226203

[51] Int. Cl.⁵ .................. H05B 1/00; G03B 27/30
[52] U.S. Cl. .................. 354/301; 219/216; 355/27
[58] Field of Search .......... 354/299, 301, 303; 355/27; 219/216; 250/319, 317.1, 318

[56] References Cited

U.S. PATENT DOCUMENTS 3,202,818  8/1965  Thomiszer ............... 219/216 X
3,301,157  1/1967  Smith et al. ............. 219/216 X
4,620,096 10/1986  Takehara et al. .
4,760,426  7/1988  Taniguchi et al. ......... 355/27
4,800,275  1/1989  Schimizu et al. .......... 355/27 X

FOREIGN PATENT DOCUMENTS 59-154445  9/1984  Japan .
59-165054  9/1984  Japan .
59-180548 10/1984  Japan .
59-218443 12/1984  Japan .
60-120366  6/1985  Japan .
61-88256   5/1986  Japan .
61-238056 10/1986  Japan .

Primary Examiner—A. A. Mathews
Attorney, Agent, or Firm—Sughrue, Mion, Zinn, Macpeak & Seas

[57] ABSTRACT

Disclosed are an apparatus for and a method of recording an image in which a heat-developable light-sensitive material and an image-receiving material are superposed on each other and the superposed two materials are inserted between an outer periphery of a heating drum and an endless belt wound around a plurality of rollers and are wound around the outer periphery of the heating drum by pressing the two materials against the outer periphery of the heating drum by the endless belt, and the heating drum is rotated by being pressed by the endless belt, so as to heat develop the heat-developable light-sensitive material and allow an image formed by heat development to be transferred onto the image-receiving material. Between the outer periphery of the heating drum and one of the rollers located on the insertion side, a gap is provided between the endless belt and the outer periphery of the heating drum on a line connecting an axis of the heating drum and an axis of the roller around which the endless belt is wound, and the two materials are inserted between the heating drum and the endless belt through this gap. Accordingly, when the two materials are inserted, the two materials are smoothly brought into pressure contact with the outer periphery of the drum by means of the endless belt.

8 Claims, 6 Drawing Sheets

IMAGE RECORDING APPARATUS AND METHOD

BACKGROUND OF THE INVENTION

1. Field of the Invention

The present invention relates to an image recording apparatus, and more particularly to a heat developing and transferring apparatus in which an imagewise exposed heat-developable light-sensitive material is superposed on an image-receiving material, and while the superposed materials are being wound around an outer periphery of a drum, the heat-developable light-sensitive material is heat developed by heating and, at the same time, an image is transferred onto the image-receiving material. Also, the present invention concerns an image recording method using said apparatus.

2. Statement of the Related Art

Conventionally, an image recording apparatus is known in which a heat-developable light-sensitive material is exposed imagewise to light, and this heat-developable light-sensitive material is superposed on an image-receiving material and subjected to heating, allowing the heat developable light-sensitive material to be heat developed and an image to be transferred onto the image-receiving material so as to obtain an image.

In this type of image recording apparatus, a heating drum and an endless pressure-contact belt are provided. The endless pressure-contact belt is wound around a plurality of winding rollers, and an outer side thereof is brought into pressure contact with an outer periphery of the heating drum.

In addition, a superposing roller which abuts against the outer periphery of the heating drum is disposed in the vicinity of a portion of the endless pressure-contact belt wound around a winding roller located at an end of the roller chain.

The imagewise exposed heat-developable light-sensitive material with the image-receiving material superposed thereon by the superposing roller is fed between the heating drum and the portion of the endless pressure contact belt wound around the winding roller on the superposing roller side (i.e., fed to a materials supplying section), and is then wound around the outer periphery of the heating drum.

The respective materials are clamped and conveyed for a predetermined time in a state in which they are superposed on each other between the endless pressure contact belt and the heating drum heated to approximately 90° C. As a result, the heat-developable light-sensitive material is heat developed, and the image formed on the heat-developable light-sensitive material is transferred onto the image-receiving material.

However, there are cases where an unevenness and blurring take place in the transferred image due to defects occurring at the time when the heat-developable light-sensitive material and the image-receiving material are wound around the outer periphery of the heating drum (i.e., between said outer periphery and the endless pressure-contact belt), or when the heat-developable light-sensitive material and the image-receiving material after transfer are released from the outer periphery of the heating drum, or when the heat-developable light-sensitive material and the image-receiving material are separated from each other after releasing. For instance, at the time of the aforementioned winding, the arrangement is such that, after the two materials are superposed on each other by the superposing roller, the materials are fed between the heating drum and a portion of the endless pressure contact belt wound around a winding roller on the superposing roller side (i.e., fed into the materials supplying section). However, since the winding roller is held in close contact with the outer periphery of the heating drum in this materials supplying section (i.e., since there is no gap between the wound endless pressure contact belt and the outer periphery of the heating drum in the materials supplying section), even if the materials undergo rapid thermal expansion at a point where they are spaced apart from the superposing roller after being clamped by the superposing roller and the heating drum and heated by the heating drum, the materials continue to be fed between the endless pressure-contact belt and the heating drum without this expansion escaping. Consequently, there have been cases where incorrect superpositions in the form of such as "wrinkles" and "peeling" occur.

As a result, when an image recorded on the heat-developable light sensitive material is transferred onto the image-receiving material, an unevenness in development and transfer can possibly occur, thereby making it impossible to obtain a desirable image.

SUMMARY OF THE INVENTION

Accordingly, an object of the present invention is to provide an apparatus for and a method of recording an image which allow a heat-developable light-sensitive material and an image-receiving material to be superposed on each other uniformly when, for instance, an imagewise exposed heat-developable light-sensitive material is superposed on the image-receiving material and the materials are wound around an outer periphery of a drum, thereby making it possible to obtain a desirable image with virtually no occurrence of an unevenness in development and transfer.

In the inventive heat developing and transferring apparatus, the imagewise exposed heat-developable light-sensitive material is superposed on the image-receiving material by being clamped by the superposing means and the drum.

Subsequently, the superposed materials are fed between the drum and the endless belt wound around a plurality of winding rollers and are wound around the outer periphery of the drum in the superposed state by a predetermined range of circumference, and the heat-developable light-sensitive material is heat developed on heating by the drum, while an image is simultaneously transferred onto the image-receiving material.

When the heat-developable light-sensitive material and the image-receiving material, after being superposed on each other, are fed between the endless belt and the drum, since one of the winding rollers located on the side of the superposing means is provided with a gap between the endless belt and the outer periphery of the drum on a line connecting its axis and an axis of the drum, the endless belt at this portion is smoothly brought into pressure contact with the outer periphery of the drum. Hence, the heat-developable light-sensitive material and the image-receiving material are wound without being pressed against each other abruptly.

By virtue of this arrangement, the two materials are gradually heated in a state in which expansion is allowed, and even if the two materials expand by heating with the heating drum at a point spaced apart from the superposing means, this expansion is allowed to escape, so that incorrect superpositions in the form of "wrinkles" and "peeling" are prevented from occurring.

Accordingly, when the two materials are superposed on each other and wound around the heating drum to effect heat development and transfer an image, an unevenness in development and transfer does not occur and it is possible to obtain a favorable image.

In addition, in an image recording method in accordance with the present invention, the two materials are superposed on each other in such a manner that a forward end of the heat-developable light-sensitive material is located forwardly of a forward end of the image-receiving material by a predetermined amount, and are clamped and conveyed by the endless belt and the heating drum so as to effect heat development and transfer. After transfer, when the forward end of the heat-developable light-sensitive material has come out of a nip between the endless belt and the heating drum, the conveying speed of the two materials is reduced below a predetermined value, so that a curl is produced in the forward end of the heat-developable light-sensitive material in the direction of moving away from the heating drum.

It should be noted that, in the image recording apparatus in accordance with the present invention, it is possible to employ heat-developable light-sensitive materials (heat developable light-sensitive elements) and image-receiving materials (dye fixing elements) disclosed in, for example, U.S. Pat. Nos. 4,430,415, 4,483,914, 4,500,626, and 4,503,137, Japanese Patent Laid Open Nos. 154,445/1984, 165,054/1984, 180,548/1984, 218,443/1984, 120,356/1985, 88,256/1986, and 238,056/1986, and Japanese Patent Application Nos. 169,585/1985 and 244,873/1985.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a description will be given of the preferred embodiments of the present invention.

Figure 1:
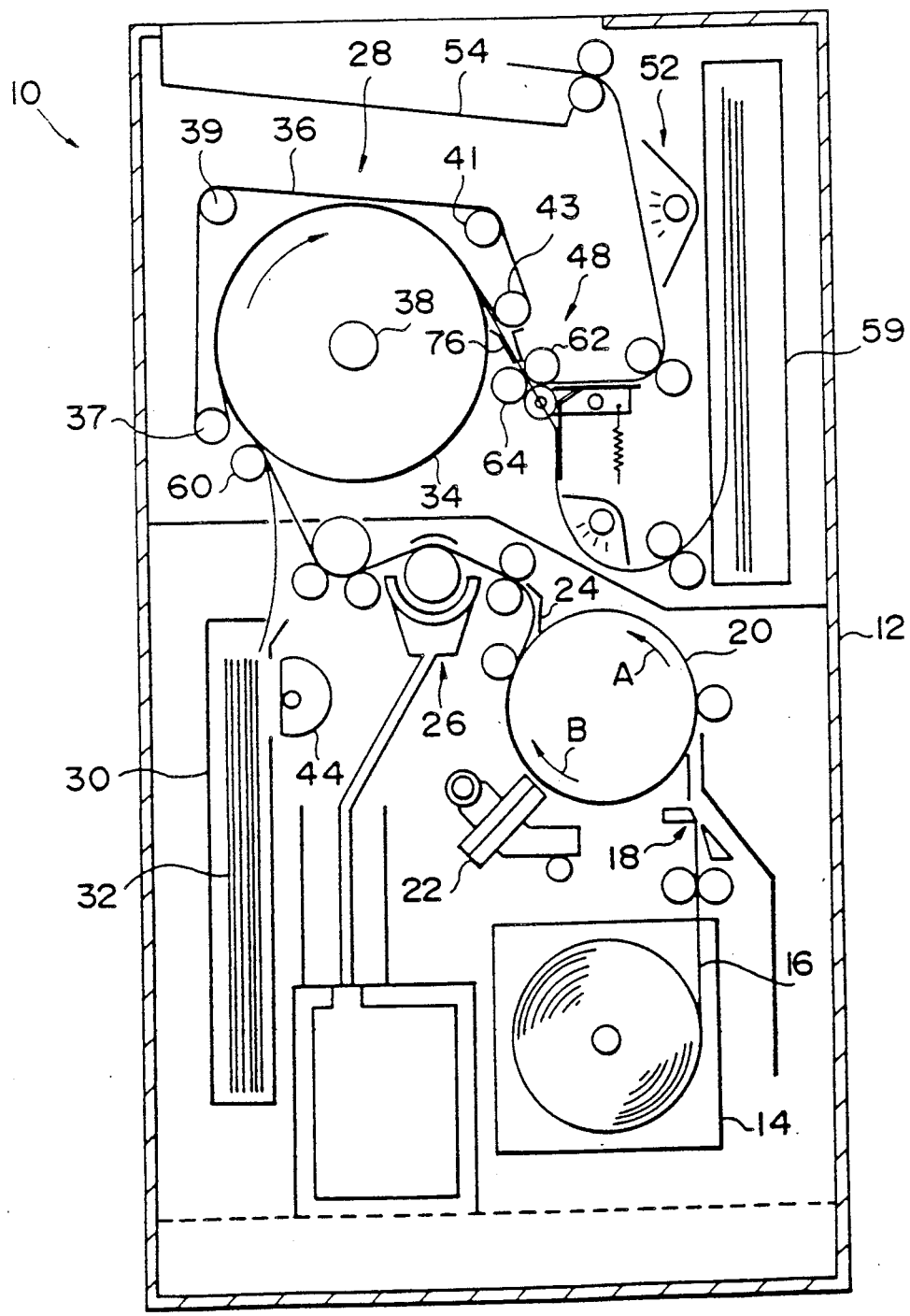
FIG. 1 is a diagram schematically illustrating an embodiment of an image recording apparatus in accordance with the present invention.

FIG. 1 illustrates an image recording apparatus 10 in accordance with an embodiment of the present invention.

A magazine 14 is disposed in an apparatus frame 12 of the image recording apparatus, and a heat-developable light-sensitive material 16 is accommodated therein in the form of a roll. The heat-developable light-sensitive material 16 comprises a support having thereon a light-sensitive silver halide, a binder, a color image forming substance, and a reducing agent.

The heat-developable light-sensitive material 16 is drawn from its outer periphery, and after it is cut is cut to a predetermined length by a cutter 18, the heat-developable light-sensitive material 16 is wound around an outer periphery of an exposure drum 20. An exposure head 22 is disposed in correspondence with the outer periphery of the exposure drum 20, and as the exposure drum 20 is rotated high speed, the heat-developable light-sensitive material 16 thus wound around is exposed imagewise to light at a widthwise central portion thereof by the exposure head 20.

As the rotating drum 20 is rotated reversely (in the direction of arrow B), the imagewise exposed heat-developable light-sensitive material 16 is scraped off the exposure drum 20 by a scraper 24, and after water serving as an image forming solvent is applied thereto in a water applying section 26, the heat-developable light-sensitive material 16 is sent to a heat developing and transferring section 28.

A heating drum 34 and an endless pressure-contact belt 36 are disposed in the heat developing and transferring section 28. The endless pressure-contact belt 36 is wound around winding rollers 37, 39, 41, 43, and its endless outer side is brought into pressure contact with an outer periphery of the heating drum 34. In this embodiment, the outside diameter of the heating drum 34 is set at 140 mm, while the outside diameter of each winding roller is set at 20 mm.

Figure 6:
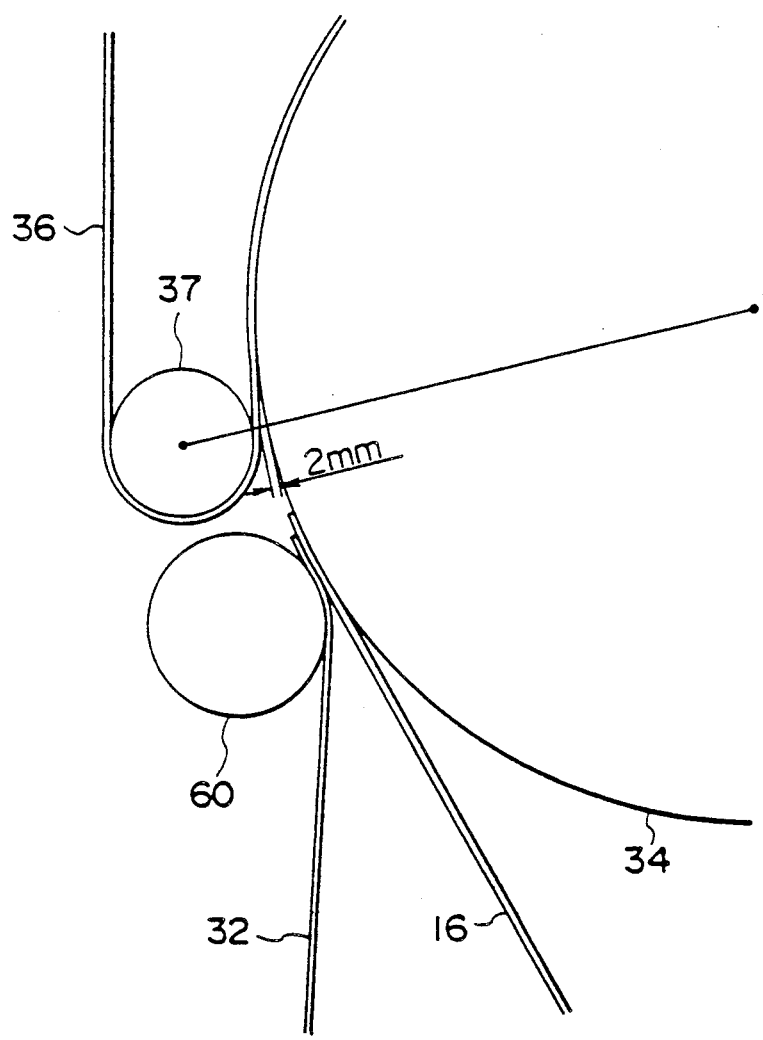
FIG. 6 is a cross-sectional view illustrating a heating drum and winding rollers in a heat developing and transferring section.

As shown in FIG. 6, the winding roller 37 is arranged such that a gap of not less than 2 mm (and preferably not more than 5 mm) is provided between the endless pressure contact belt 36 and the outer periphery of the heating drum 34 on a line connecting the axis of the winding roller 37 and the axis of the heating drum 34. Accordingly, the endless pressure contact belt 36 is smoothly brought into pressure contact with the outer periphery of the heating drum 34 at a portion of the endless pressure-contact belt 36 wound around the winding roller 37.

Disposed in the vicinity of the portion of the endless pressure-contact belt 36 wound around the winding roller 37 adjacent to the outer periphery of the heating drum 37 is a rubber made superposing roller 60 which serves as a superposing means. The superposing roller 60 is disposed in such a manner as to abut against the outer periphery of the heating drum 34. The gap between this superposing roller 60 and the heating drum 34 serves as a superposing section. The superposing roller 60 allows the heat-developable light-sensitive material 16 fed from the water applying section 26 to move along the outer periphery of the heating drum 34 so as to be fed between the heating drum 34 and the endless pressure-contact belt 36. In this embodiment, the outside diameter of the superposing roller 60 is set at 25 mm.

A halogen lamp 38 is disposed inside the heating drum 34, and the outer periphery of the heating drum 34 is heated to approximately 90° C. by this halogen lamp 38. Consequently, the heat-developable light-sensitive material 16 fed between the heating drum 34 and the endless pressure-contact belt 36 by the superposing roller 60 is conveyed in a clamped state about two thirds of the circumference of the heating drum 34 so as to be heat developed. In this embodiment, the conveying speed of the heat-developable light-sensitive material 16 conveyed by the heating drum 34 is set at 20 mm/sec.

Meanwhile, a plurality of pieces of image-receiving material 32 cut to predetermined lengths are accommodated in a tray 30 disposed below the heat developing and transferring section 28.

Figure 5:
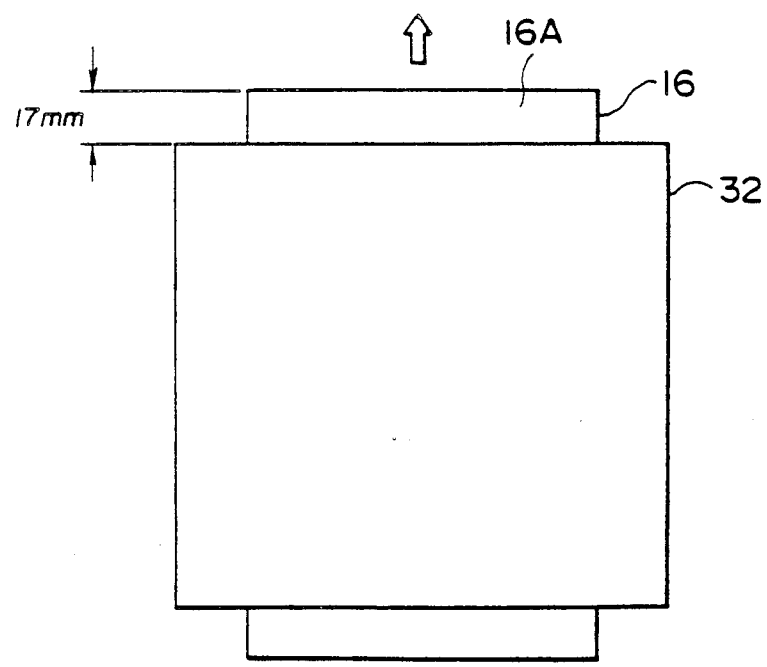
FIG. 5 is a top plan view illustrating dimensional relationships between a heat-developable light-sensitive material and an image-receiving material in a superposed state.

The width of the image-receiving material 32 is set to be greater than that of the heat-developable light-sensitive material 16, as shown in FIG. 5, and a dye fixing material containing a mordant is applied to its image forming surface. This image-receiving material 32 is consecutively taken out one by one by a feed roller 44 disposed on the tray 30 side. The image-receiving material 32 taken out is supplied between the superposing roller 60 and the heating drum 34 of the heat developing and transferring section 28.

The image-receiving material 32 fed to the superposing roller 60 is superposed on the heat-developable light-sensitive material 16 as it is clamped by the superposing roller 60 and the heating drum 34. In this case, as shown in FIG. 5, the superposition is effected in such a manner that the forward end of the heat-developable light-sensitive material 16 in the conveying direction projects from the forward end of the image-receiving material 32 in the conveying direction. In this embodiment, the length of this projecting end portion 16A is set at about 17 mm. In addition, in this embodiment, the overall thickness of the heat-developable light-sensitive material 16 and the image-receiving material 32 in a superposed state is set to 0.2 mm.

The two materials superposed on each other by the superposing roller 60 are fed between the heating drum 34 and the endless pressure-contact belt 36 in a superposed state.

In this case, since the endless pressure-contact belt 36 is smoothly brought into pressure contact with the outer periphery of the heating drum 34 at the portion of the endless pressure contact belt 36 wound around the winding roller 37 (i.e., since a gap of not less than 2 mm is provided between the endless pressure-contact belt 36 and the outer periphery of the heating drum 34), the heat-developable light-sensitive material 16 and the image-receiving material 32 are wound around without being abruptly pressed against each other.

When the heat-developable light-sensitive material 16 is heated in the heat developing and transferring section 28 in a state in which it is superposed on the image-receiving material 32, the heat-developable light-sensitive material 26 is heat developed, and an image is transferred onto the image-receiving material 32, thereby allowing the image to be obtained on the image-receiving material 32.

The heating drum 34 and the endless pressure-contact belt 36 which clamp and convey the heat-developable light-sensitive material 16 and the image-receiving material 32 in a superposed state are arranged such that they are capable of temporarily stopping the conveyance when the projecting portion 16A at the forward end of the heat-developable light-sensitive material 16 after transfer has come out of a nip between the heating drum 34 and the endless pressure-contact belt 36 on the downstream side in the conveying direction (i.e., downstream side of the portion of the endless pressure-contact belt 36 wound around the tension roller 43). When the heat-developable light-sensitive material 16 is heated by stopping the conveying operation, since the heat-developable light-sensitive material 16 is wound with its exposure surface (dye surface) facing away from the heating drum 34, a force is exerted on the projecting portion 16A at the forward end thereof in such a manner as to cause said projecting portion 16A to curl away from the heating drum 34.

A separating device 48 is disposed in the vicinity of the portion of the endless pressure-contact belt 36 wound around the tension roller 43.

Figure 2:
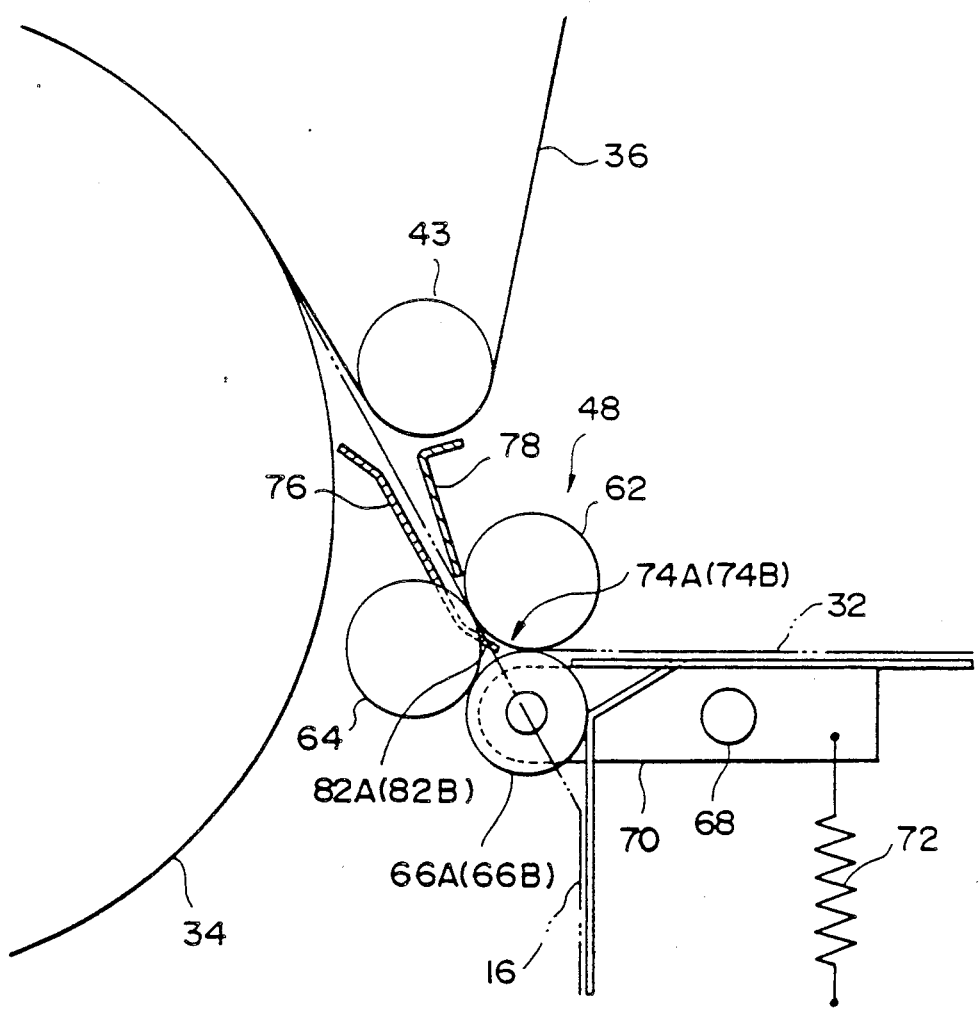
FIG. 2 is a cross-sectional view of a separating device.
Figure 3:
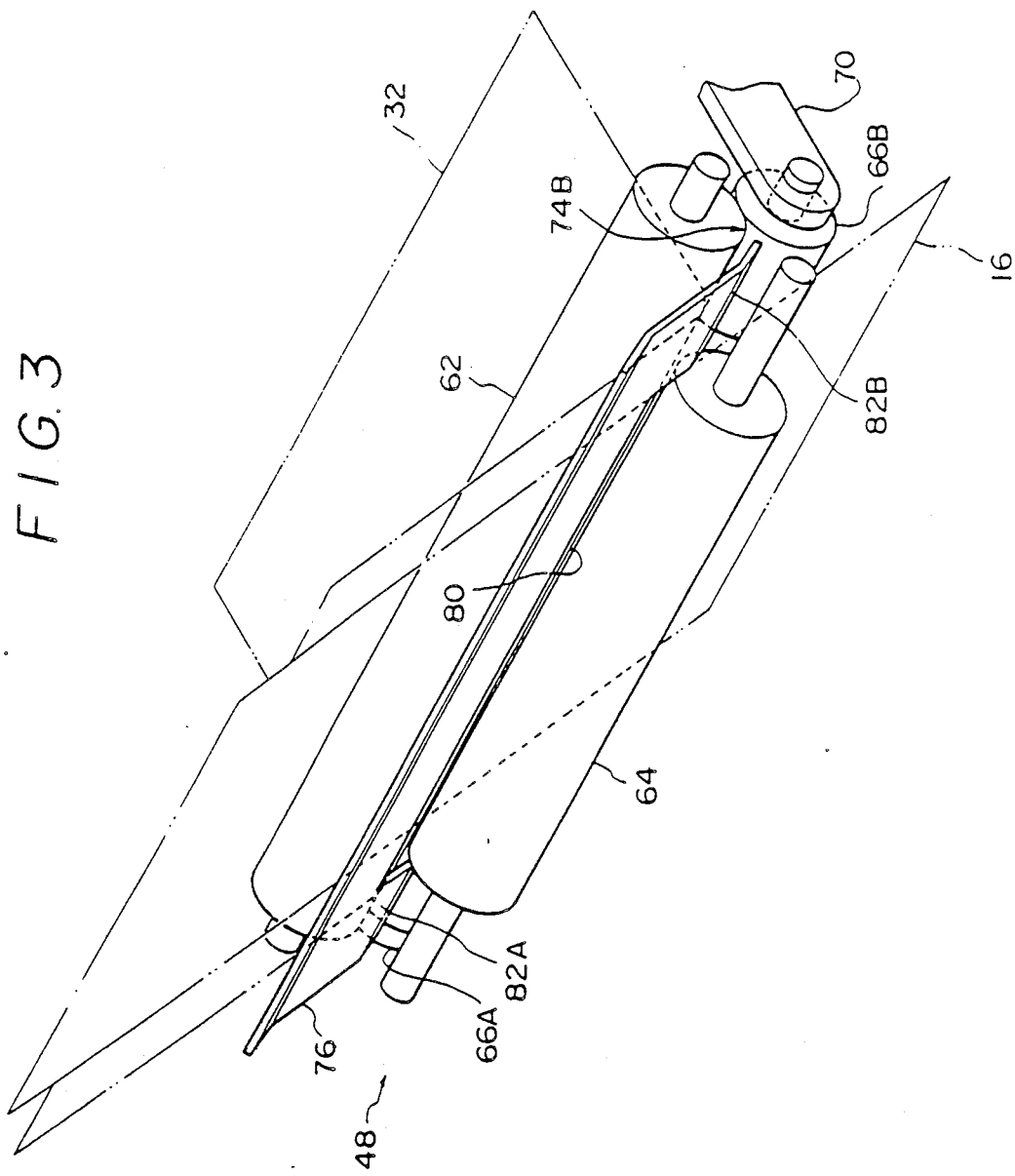
FIG. 3 is a perspective view of the separating device.
Figure 4:
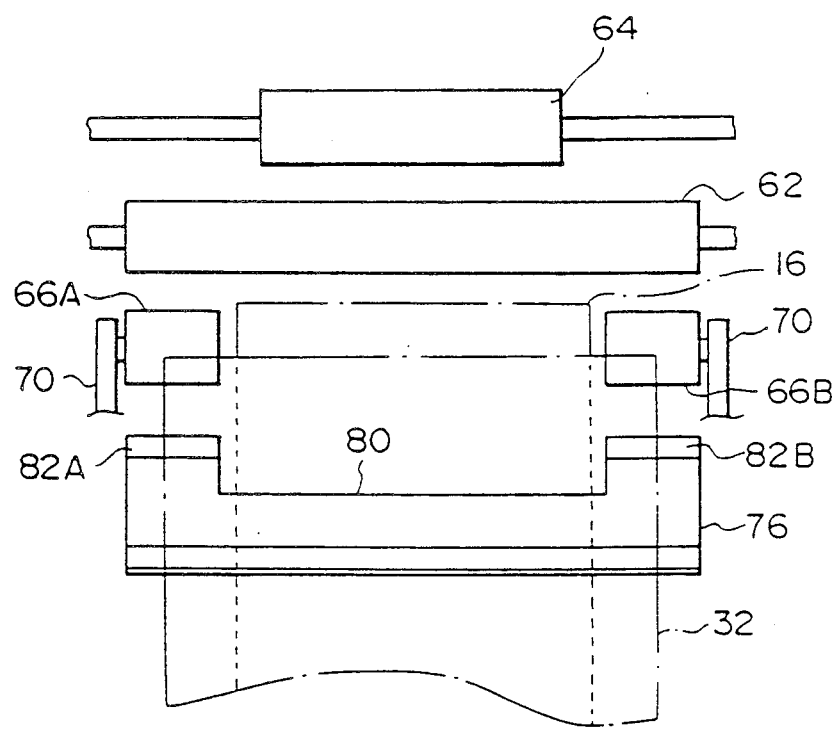
FIG. 4 is a schematic top plan view illustrating the dimensional relationships among rollers of the separating device.

As shown in detail in FIGS. 2 to 4, a pair of drive roller 62, 64 are disposed in the separating device 48. The axial length of the drive roller 62 is set to be greater than with widths of the heat-developable light-sensitive material 16 and the image-receiving material 32, and the drive roller 62 is rotated by being connected to an unillustrated driving source.

Meanwhile, the drive roller 64 is disposed parallel with and spaced apart from the drive roller 62, and its axial length is set to be smaller than the width of the heat-developable light-sensitive material 16, as shown in FIG. 4. This drive roller 64 is also adapted to rotate by being connected to the unillustrated driving source.

A pair of free rollers 66A, 66B are respectively disposed in the vicinity of opposite ends of the drive roller 62 in correspondence with said opposite ends in parallel with the axial direction of the drive roller 62. The free rollers 66A, 66B are respectively rotatably supported by one end portions of a pair of arms 70 with their longitudinally central portions supported by a shaft 68. Furthermore, a tension spring 72 for urging said one end portion toward each opposite end of the drive roller 62 is connected to the other end portion of each arm 70. As a result, the free rollers 66A, 66B are constantly brought into pressure contact with the axially opposite ends of the drive roller 62, respectively, and are hence adapted to rotate by following the rotation of the drive roller 62. Contact portions between the free rollers 66A, 66B and the drive roller 62 serve as separating portions 74A, 74B, and the image-receiving material 32 is clamped and conveyed by these separating portions 74A, 74B.

A pair of guide plates 76, 78 are disposed between the free rollers 66A, 66B (drive roller 64) and the portion of the endless pressure contact belt 36 wound around the tension roller 43.

The guide plate 76 disposed on the heating drum 34 side is located within a range defined by the outer periphery of the heating drum 34 and a tangent which touches the heating drum 34 at the position where the heat-developable light-sensitive material 16 and the image-receiving material 32 fed out from the nip between the endless pressure-contact belt 36 and the heating drum 34 are released from the heating drum 34.

In addition, as shown in FIGS. 3 and 4, and end portion of the guide plate 76 on the drive roller 64 side is notched into a rectangular shape, and a notched portion 80 is thus formed., The opposite sides of the notched portion 80, i.e., the widthwise (in the axial direction of each roller) opposite ends of the guide plate 76, serve as guide portions 82A, 82B. The dimension of the notched portion 80 is set to be slightly greater than the axial length of the drive roller 64, the drive roller 64 being arranged to be located within the notched portion 80.

In the same way as the guide plate 76, the guide portions 82A, 82B are located within the range defined by the outer periphery of the heating drum 34 and a tangent which touches the heating drum 34 at the position where the heat-developable light-sensitive material 16 and the image-receiving material 32 fed out from the nip between the endless pressure contact belt 36 and the heating drum 34 are released from the heating drum 34.

In addition, the guide portions 82A, 82B are slightly bent toward the free rollers 66A, 66B, and correspond to the gaps between the free rollers 66A, 66B and the drive roller 62, i.e., the separating portions 74A, 74B.

In consequence, the guide plate 76 is so arranged that the heat developable light-sensitive material 16 and the image-receiving material 32 fed out from the nip between the endless pressure contact belt 36 and the heating drum 34 can be guided between the drive roller 62 and the drive roller 64 after passing through the aforementioned range defined by the outer periphery of the heating drum 34 and a tangent which touches the heating drum 34 at the position where the materials fed out from the nip between the endless pressure-contact belt 36 and the heating drum 34 are released from the heating drum 34. At the same time, the guide portions 82A, 82B of the guide plate 76 are located on the drive roller 62 side and are adapted to engage with the widthwise opposite end portions of the image-receiving material 32 whose width is greater than the width of the heat-developable light-sensitive material 16 (the widthwise opposite side portions of the material 32 being projecting from the respective widthwise opposite side portions of the heat-developable light-sensitive material 16), thereby bending this image-receiving material 32 alone toward the separating portions 74A, 74B in order to guide and move the same. Accordingly, the image-receiving material 32 fed to the separating portions 74A, 74B is separated from the heat-developable light-sensitive material 16 and is then conveyed.

In this case, the separating position in which the image-receiving material 32 is separated from the heat-developable light-sensitive material 16 also falls within the aforementioned range defined by the outer periphery of the heating drum 34 and a tangent which touches the heating drum 34 at the position where the materials fed out from the nip between the endless pressure contact belt 36 and the heating drum 34 are released from the heating drum 34.

The heat-developable light-sensitive material 16 thus separated is fed to a disposed light-sensitive material accommodating box 59, while the image-receiving material 32 is dried by a drier 52 and is then fed to a discharge tray 54 formed at the top of the apparatus frame 12.

The operation of this embodiment will be described hereinunder.

After the heat-developable light-sensitive material 16 drawn out from the magazine 14 is cut by the cutter 18 and then wound around the outer periphery of the exposure drum 20, the exposure drum 20 rotates at high speed in the direction of arrow A in FIG. 1, and the heat-developable light-sensitive material 16 is exposed imagewise to light by the exposure head 22.

After exposure, as the exposure drum 20 is rotated reversely (in the direction of arrow B), the heat-developable light-sensitive material 16 is scraped off the exposure drum 20 by means of the scraper 24, water is applied thereto in the water applying section 26, and the heat-developable light-sensitive material 16 is then fed to the superposing roller 60 disposed in the heat developing and transferring section 28.

Meanwhile, the pieces of image-receiving material 32 in the tray 30 are taken out consecutively one by one by means of the feed roller 44, and are fed to the superposing roller 60 in the heat developing and transferring section 28.

The image-receiving material 32 thus fed to the superposing roller 60 is superposed on the heat-developable light-sensitive material 16 by being clamped by the heating drum 34 and the superposing roller 60 and is brought into close contact with each other. Furthermore, the heat-developable light-sensitive material 16 and the image-receiving material 32 thus superposed on each other by the superposing roller 60 are fed between the heating drum 34 and the endless pressure-contact belt 36 (the winding portion of the winding roller 37) and are wound around the outer periphery of the heating drum 34. In this case, as shown in FIG. 5, the image-receiving material 32 is superposed on the heat-developable light-sensitive material 16 in such a manner that the forward end portion of the heat-developable light-sensitive material 16 in the conveying direction projects from the forward end portion of the 32 projects by about 17 mm.

In addition, the winding roller 37 is disposed such a gap of not less than 2 mm is provided between the endless pressure-contact belt 36 and the outer periphery of the heating drum 34 on a line connecting the axis of the winding roller 37 and the axis of the heating drum 34. Accordingly, since the endless pressure-contact belt 36 is smoothly brought into pressure contact with the outer periphery of the heating drum 34 at the portion of the endless pressure-contact belt 36 wound around the winding roller 37, the heat developable light-sensitive material 16 and the image-receiving material 32 are wound without being abruptly pressed against each other.

Hence, the respective materials are heated gradually in a state in which expansion is allowed, and even if the materials expand by being heated by the heating roller 34 at the point where they are spaced apart from the superposing roller 60, this expansion is allowed to escape, thereby preventing the occurrence of faulty superpositions in the form of such as "wrinkles" and "peeling".

It has been experimentally verified if the overall thickness of the heat-developable light-sensitive material 16 and the image-receiving material 32 in a superposed state is 0.2 mm, and if the gap between the endless pressure-contact belt 36 and the outer periphery of the heating drum 34 is 0 mm or 1 mm, there are cases where incorrect superpositions occur. Accordingly, this gap is preferably set at not less than 2 mm as in the case of this embodiment.

On the other hand, if the gap is set too large, the effective winding length of the belt becomes short, and it is necessary to make the heat developing and transferring section large, so that the gap is preferably set at not more than 5 mm.

The heat-developable light-sensitive material 16 and the image-receiving material 32 wound around the outer periphery of the heating drum 34 are clamped and conveyed at a predetermined conveying speed (20 mm/sec.) about two thirds of the circumference of the heating drum 34 in a state in which they are held in close contact with each other between the endless pressure-contact belt 36 and the heating drum 34 heated to approximately 90° C. by the halogen lamp 38, so as to be subjected to heat development. At the same time, the image recorded on the heat-developable light-sensitive material 16 is transferred onto the image-receiving material 32. In short, the heat-developable light-sensitive material 16 superposed on the image-receiving material 32 emits a movable dye when heated, and this dye is transferred into the dye fixing layer of the image-receiving material 32, thereby allowing an image to be obtained on the image-receiving material 32.

In this case, since there is no occurrence of incorrect superpositions in the form of such as "wrinkles" and "peeling" when the heat-developable light-sensitive material 16 and the image receiving material 32 are superposed on each other and wound around the outer periphery of the heating drum 34, it is possible to obtain a favorable image with virtually no occurrence of an unevenness in development and transfer when heat development and transfer are effected by heating with the heating drum 34.

When the heat-developable light-sensitive material 16 is conveyed in a clamped state, and its projecting portion 16A at the forward end thereof after transfer comes out of the nip between the heating drum 34 and the endless pressure-contact belt 36 on the downstream side in the conveying direction (i.e., downstream of the portion of the endless pressure contact belt 36 wound around the tension roller 43), the driving of the heating drum 34 and the endless pressure contact belt 36 is stopped temporarily.

When the heat-developable light-sensitive material 16 is heated with the conveyance stopped, since the heat-developable light-sensitive material 16 is wound with its exposure surface (dye surface) facing away from the heating drum 34, a force is exerted on the projecting portion 16A at the forward end thereof in such a manner as to cause said projecting portion 16A to curl away from the heating drum 34.

When a curl has occurred at the projecting portion 16A at the forward end of the heat-developable light-sensitive material 16 in the direction of moving away from the heating drum 34, the conveyance by the heating drum 34 and the endless pressure-contact belt 36 is resumed.

After resumption of conveyance, the heat-developable light-sensitive material 16 and the image-receiving material 32 are fed to the separating device 48.

In the separating device 48, the heat-developable light-sensitive material 16 and the image-receiving material 32 fed out from the nip between the endless pressure-contact belt 36 and the heating drum 34 are guided into a nip between the drive roller 62 and the drive roller 64 by means of the guide plates 76, 78.

In this case, since the heat-developable light-sensitive material 16 and the image-receiving material 32 fed out are fed between the drive roller 62 and the drive roller 64 after passing through the range defined by the outer periphery of the heating drum 34 and a tangent which touches the heating drum 34 at the position where the two materials are released from the heating drum 34, the heat-developable light-sensitive material and the image-receiving material after their release move with their posture of being superposed and wound around the outer periphery of the heating drum 34 (i.e., a curved state) being maintained, i.e., without becoming curved away from the heating drum 34.

Since the image-receiving material 32 has a width greater than that of the heat-developable light-sensitive material 16 and is superposed on the heat-developable light-sensitive material 16 with its widthwise opposite side portions projecting from the widthwise side portions of the heat-developable light-sensitive material 16, the guide portions 82A, 82B of the guide plate 76 engage with the widthwise opposite side portions of the image receiving material 32 and bend the image receiving material 32 alone toward the separating portions 74A, 74B so as to guide and move the same. The image-receiving material 32 fed to the separating portions 74A, 74B is clamped by the drive roller 62 and the free rollers 66A, 66B and is conveyed after being separated from the heat-developable light-sensitive material 16.

Meanwhile, the heat-developable light-sensitive material 16 separated from the image-receiving material 32 is imparted a conveying force by the drive roller 64 and moves downward through the gap between the opposing free rollers 66A, 66B.

The position in which the image-receiving material 32 fed to the separating portions 74A, 74B is separated from the heat-developable light-sensitive material 16 falls in the range defined by the outer periphery of the heating drum and a tangent which touches the heating drum 34 at the position where the two materials are released therefrom, as in the case of its conveying path after release from the heating drum 34. Accordingly, there is no partial slippage or peeling which would otherwise occur when the material disposed on the outer side with respect to the heating drum and the material disposed on the inner side are curved away from the heating drum 34. As a result, it is possible to obtain a favorable image which is free from a blurring.

In addition, since the heat-developable light-sensitive material 16 and the image-receiving material 32 are automatically separated from each other while being conveyed, parts such as a sensor for detecting an operating timing become unnecessary, contributing to a reduction in costs.

Furthermore, since the image-receiving material 32 is guided by being bent toward the separating portions 74A, 74B as its widthwise side portions alone are engaged with the guide portions 82A, 82B of the guide plate 76, there is no possibility of the image-receiving material 32 deviating from its normal conveying path and entering the conveying path of the heat-developable light-sensitive material 16, so that no jamming occurs.

Since the drive rollers 62, 64 are spaced apart from each other, the heat-developable light-sensitive material 16 and the image-receiving material 32 after transfer are not brought into pressure contact with each other again, so that a favorable image can be obtained without the occurrence of a blurring in the image.

The heat-developable light-sensitive material 16 separated by the separating device 48 is fed to the disposed light-sensitive material accommodating box 59, while the image-receiving material 32 is discharged to the discharge tray 54.

In this embodiment, the arrangement is such that the conveyance of the heat-developable light-sensitive material 16 and the image-receiving material 32 is stopped temporarily at the time when the projecting portion 16A at the forward end of the heat-developable light-sensitive material 16 has come out of the nip between the heating drum 34 and the endless pressure-contact belt 36 on the downstream side in the conveying direction (i.e., downstream of the portion of the endless pressure-contact belt 36 wound around the tension roller 43). However, the present invention is not confined to the same, and an arrangement may be alternatively provided such that the two materials are temporarily conveyed at a speed slower than the conveying speed for transfer (i.e., 20 mm/sec.) and, after the occurrence of a curl, the conveyance is resumed at the predetermined conveying speed.

What is claimed is:

1. An image recording apparatus for obtaining an image by heat developing a heat developable light-sensitive material and for transferring the image onto an image-receiving material, comprising:

a heating drum adapted to be rotated in a predetermined direction;

superposing means disposed on an outer periphery of said heating drum and adapted to superpose said heat-developable light-sensitive material and said image-receiving material on each other;

pressing means for pressing and winding said superposed heat-developable light-sensitive material and said image-receiving material around said outer periphery of said heating drum over a predetermined range in the rotating direction of said heating drum so as to obtain an image by heat developing said heat-developable light-sensitive material and transfer the image onto said image-receiving material, said pressing means including an endless belt, which is brought into contact with said outer periphery of said heating drum over said predetermined range, and a plurality of winding rollers around which said endless belt is wound and which press said endless belt over said predetermined range, a first winding roller defining an end of a roller train formed by said winding rollers over said predetermined range being disposed in such a manner that a predetermined gap is provided between said endless belt and said outer periphery of said heating drum on a line connecting an axis thereof and an axis of said heating drum; and a separating device for separating said heat-developable light-sensitive material and said image-receiving material from each other after said transfer is effected and said heat-developable light-sensitive material and said image receiving material are released from said heating drum.

2. An image recording device according to claim 1, wherein said predetermined gap is set at not less than 2 mm and not more than 5 mm.

3. An image recording device according to claim 1, wherein said superposing means superposes said heat-developable light-sensitive material and said image-receiving material on each other in such a manner that said image-receiving material is disposed on the outer side, a forward end portion of said heat-developable light-sensitive material being located more forwardly in the rotating direction of said heating drum by a predetermined amount than a forward end portion of said image-receiving material, and widthwise opposite side portions of said image-receiving material being located outwardly of widthwise opposite side portions of said heat-developable light-sensitive material.

4. An image recording device according to claim 3, wherein said separating means includes guide means for separating from each other said heat-developable light-sensitive material and said image-receiving material released from said heating drum while guiding heat-developable light-sensitive material and said image-receiving material in a range defined by said outer periphery of said heating drum and a tangent which touches said heating drum at the releasing position, and conveying means for conveying said separated heat-developable light-sensitive material and image-receiving material in different directions within said range.

5. An image recording apparatus according to claim 4, wherein said guide means includes a guiding section disposed on the side of said heat-developable light-sensitive material within said range and adapted to guide said two materials, said guiding section having a separating section for separating said image receiving material from said heat-developable light-sensitive material by pressing said widthwise side portions of said image-receiving material during guiding.

6. An image recording apparatus according to claim 5, wherein said conveying means includes a first drive roller which has an axis parallel with the widthwise direction of said heat-developable light-sensitive material, an axial length thereof being smaller than the width of said heat-developable light-sensitive material, and which is adapted to convey said heat-developable light-sensitive material by abutting against a surface thereof, and a second drive roller which is disposed parallel with and spaced apart from said first drive roller and is adapted to convey said image-receiving material by abutting against a surface thereof.

7. An image recording apparatus according to claim 6, wherein said conveying means further includes a pair of free rollers respectively having axes parallel with said second drive roller and disposed in correspondence with said widthwise opposite side portions of said image-receiving material and which are adapted to press said image-receiving material against said second drive roller by pressing said widthwise opposite side portions thereof.

8. An image recording apparatus according to claim 7, wherein said pair of free rollers are urged toward said second drive roller by urging means.

* * * * *